United States Patent
Schröer

(10) Patent No.: US 8,177,567 B2
(45) Date of Patent: May 15, 2012

(54) APPARATUS FOR SIGNAL AND CURRENT TRANSMISSION BETWEEN END POINTS WHICH CAN MOVE RELATIVE TO ONE ANOTHER

(75) Inventor: Frank Schröer, Welden (DE)

(73) Assignee: Nexans, Paris (FR)

( * ) Notice: Subject to any disclaimer, the term of this patent is extended or adjusted under 35 U.S.C. 154(b) by 437 days.

(21) Appl. No.: 12/288,728

(22) Filed: Oct. 22, 2008

(65) Prior Publication Data
US 2009/0133924 A1 May 28, 2009

(51) Int. Cl.
*H01R 3/00* (2006.01)
(52) U.S. Cl. .......................... 439/164; 439/15
(58) Field of Classification Search .................. 439/164, 439/165, 162, 31, 11, 13, 15, 640
See application file for complete search history.

(56) References Cited

U.S. PATENT DOCUMENTS
5,310,356 A    5/1994  Obata et al. .................... 439/169
7,018,223 B2 * 3/2006  Kober et al. ................... 439/164
* cited by examiner

*Primary Examiner* — Felix O Figueroa
(74) *Attorney, Agent, or Firm* — Sofer & Haroun, LLP

(57) ABSTRACT

Apparatus for signal and current transmission between end points capable of moving relative to one another having a flat ribbon line arranged in between. The ribbon has at least two conductors, embedded in an insulating sheath. The ribbon is subdivided into winding areas, connected by a U-shaped reversal point and is accommodated in a cassette, having a rotor and stator. The rotor and stator enclose between them an annular winding area for the ribbon. A strip of insulating material is arranged in the winding area of the cassette and has at least two sections which are offset with respect to one another in the circumferential direction of the cassette and have reversal points and associated winding areas. The strip is placed around turning points, fitted to the stator. The strip supports the ribbon such that turns of the ribbon do not fall on one another.

6 Claims, 2 Drawing Sheets

APPARATUS FOR SIGNAL AND CURRENT TRANSMISSION BETWEEN END POINTS WHICH CAN MOVE RELATIVE TO ONE ANOTHER

The invention relates to an apparatus for signal and current transmission between end points which can move relative to one another, between which at least one flat ribbon line, which runs in turns is arranged, which flat ribbon line has at least two electrical conductors, which are embedded in parallel and at a distance from one another in a sheath composed of insulating material, and which flat-ribbon line is subdivided into an inner winding area and an outer winding area, which is connected thereto by means of an approximately U-shaped reversal point, with each winding area having a different winding direction, and which flat-ribbon line is accommodated in an essentially circular cassette, in which the cassette comprises a rotor, which can rotate about its axis and is fitted with at least one of the end points, and a stationary stator, which is likewise fitted with at least one of the end points, which rotor and stator enclose between them an annular winding area for accommodation of the flat-ribbon line, and with one of the winding areas being arranged in the area of the rotor and the other being arranged in the area of the stator (EP 0 556 779 B1).

By way of example, an apparatus such as this is required for supplying current and/or for supplying signals to moving parts of a motor vehicle. For this purpose it can be used, for example, in the steering wheel of a motor vehicle, or else at some other point, for example in a steering gear box. The major task of this apparatus is to transmit current and/or signals between stationary and moving parts, without the use of sliding contacts.

In the known apparatus according to EP 0 735 632 B1, the wound flat-ribbon line is subdivided into an inner and an outer winding area. The turns in the two winding areas are in different winding directions. The two winding areas of the flat-ribbon line are connected to one another by means of an approximately U-shaped reversal point. An annular guide body which passes through the reversal point and can be moved in the circumferential direction of the cassette is located between the two winding areas. It is moved by the wound flat-ribbon line or by its reversal point when the rotor of the cassette is rotated. The guide body is used on the one hand to guide the flat ribbon line while the winding areas are being wound up and unwound, and on the other hand as a spacer between the two winding areas, in order to ensure that there terms do not coincide.

The apparatus according to EP 0 556 779 B1, as described initially, operates without a guide body for the winding areas of the flat-ribbon line. By way of example, instead of this, four flat-ribbon lines are arranged in the cassette of this apparatus, each of which has two winding areas which are connected by a U-shaped reversal point. Each flat ribbon line in this case rests with a greater length in the winding areas on the one hand on the rotor and on the other hand on the stator of the cassette. Each flat-ribbon line is connected at its ends to an end point which is fitted to the rotor and to an end point which is fitted to the stator. The end points and therefore also the flat-ribbon lines are offset in the circumferential direction of the cassette. The flat-ribbon lines are thus supported with respect to one another such that their turns cannot coincide, even without a separate supporting body. The installation of four flat-ribbon lines is technically complex and requires a large amount of material, particularly when less than four flat-ribbon lines are required for transmission of current and/or signals for specific applications.

The invention is based on the object of designing the apparatus described initially such that even a reduced number of flat-ribbon lines, down to just one flat-ribbon line, arranged in the winding area of the cassette is or are adequately stabilized.

According to the invention, this object is achieved in that in addition to the at least one flat-ribbon line, a strip which runs in turns and is composed of insulating material is arranged in the winding area of the cassette and in its profile has at least two sections which are offset with respect to one another in the circumferential direction of the cassette and have reversal points and associated winding areas with a different winding direction, which strip in its profile is placed around turning points, which are fitted to the stator and/or rotor of the cassette and from each of which the turns of winding areas of two different sections of the strip with an opposite profile originate, and which strip is fixed by its ends on the stator and/or on the rotor.

The strip that is used in addition to at least one flat-ribbon line in this apparatus has at least two sections with reversal points which are offset in the circumferential direction of the cassette, and with associated winding areas with different winding directions. It is therefore intrinsically adequately stable, as a result of which its turns cannot become mixed with one another in the various winding areas. The strip ensures that the flat-ribbon lines which are in the winding area of the cassette and are offset in the circumferential direction of the cassette are likewise adequately stabilized. This applies in particular even when just one flat-ribbon line is used in the cassette. In this case, the strip preferably has three or particularly advantageously four, sections which are offset in the circumferential direction of the cassette with reversal points and associated winding areas. In all the possible exemplary embodiments, only a single strip is used irrespective of the number of flat-ribbon lines provided in the winding area of the cassette, which single strip has at least two sections with reversal points which merge into one another at the turning points.

In one preferred embodiment, the strip which is used in this apparatus has an even number of sections with reversal points. This makes it easier to install the strip in the cassette, because its ends are then fixed only either on the rotor or on the stator itself.

Exemplary embodiments of the subject matter of the invention are illustrated in the drawings, in which.

Figure 1:
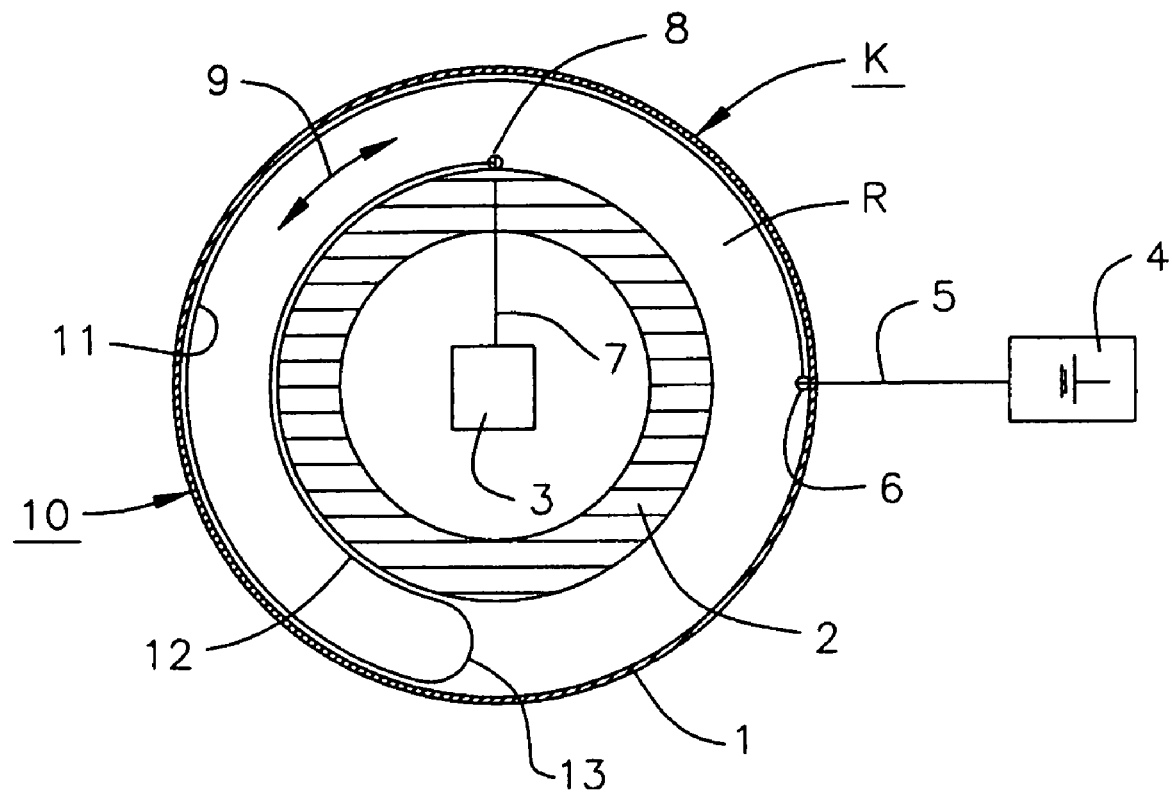
FIG. 1 shows a view of a cassette for an apparatus for signal and current transmission with two end points, illustrated schematically.

The design and arrangement of an apparatus having an apparatus, which for example can be installed in the steering wheel of a vehicle, with a cassette are in principal known and are described, for example, in the documents mentioned initially. Corresponding details will therefore not be described in more detail here. For the sake of simplicity, the word "cassette" is used in the following text, instead of the word "apparatus". FIG. 1 is intended only to provide a basic explanation of the method of operation of the cassette.

FIG. 1 shows, schematically, two walls 1 and 2 which, for example, are circular and arranged concentrically, of a cassette K. By way of example, the wall 1 belongs to the stator of the cassette K, while the wall 2 belongs to its rotor. The cassette K is intended for installation in the steering wheel of a motor vehicle. In order to supply current to electronics 3, by means of whose signal an airbag can be triggered, the cassette K is connected to a voltage source 4 in the motor vehicle. The voltage source 4 is connected via an electrical line 5 to an end point 6, which is in the form of a fixed point, of the cassette K. The electronics 3 are connected via an electrical line 7 to an end point 8 of the cassette K, which can be moved in the direction of the double-headed arrow 9. In principle, the end point 8 could be fixed and the end point 6 could be designed to be movable. A flat-ribbon line 10 with at least two electrical conductors is fitted in a winding area R, which is bounded by the walls 1 and 2, between the two end points 6 and 8. The flat-ribbon line 10 is, in one preferred embodiment, in the form of a flat-conductor ribbon line with flat or rectangular conductors. A line such as this is relatively thin overall and also occupies little space even when it runs in a plurality of turns located alongside one another.

As shown in FIG. 1, the flat-ribbon line 10 is arranged in the cassette K in turns which are subdivided into an outer winding area 11 and an inner winding area 12. In a mid-position, which can be seen in FIG. 1, and in the installation position of the cassette K, they each comprise at least one turn. The turns of the flat-ribbon line 10 are wound in opposite directions in the two winding areas 11 and 12. They rest on the one hand on the stator (wall 1) and on the other hand on the rotor (wall 2) of the cassette K. The winding areas 11 and 12 are connected to one another by an approximately U-shaped reversal point 13 of the flat-ribbon line 10.

During rotation of the steering wheel of a vehicle in which the cassette K is fitted, its rotor is also rotated in the direction of the double-headed arrow 9. The rotor drives the connected flat-ribbon line 10 via the end point 8, such that its reversal point 13 moves backwards and forwards in the circumferential direction of the cassette K.

Figure 2:
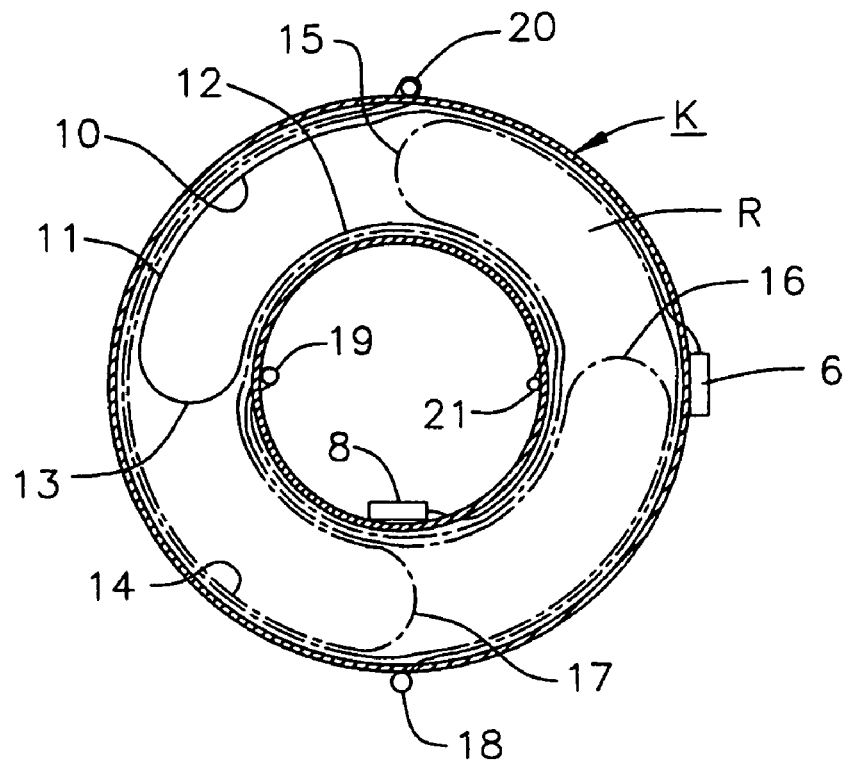
FIGS. 2 and 3 show two different embodiments of a cassette, which can be used in the apparatus according to the invention, likewise illustrated schematically.

In order to prevent the turns of the flat-ribbon line 10 becoming mixed together and/or falling on one another in the winding areas 11 and 12, a strip 14 composed of insulating material is additionally arranged in the winding area R as shown in FIG. 2, and likewise runs in turns, although with more turns than the flat-ribbon line 10 and with a continually alternating winding direction. In order to distinguish better between the flat-ribbon line 10 and the strip 14, the strip 14 is illustrated as an interrupted or dashed line.

By way of example, the strip 14 is composed of polyester or polyethylenetherephthalate. It advantageously has the same height and width as the flat-ribbon line 10. As shown in FIG. 2, the strip 14 has three sections, which are offset in the circumferential direction of the cassette K with reversal points 15, 16 and 17 and winding areas adjacent thereto with different winding directions. The three sections of the strip 14 support one another and the flat-ribbon line 10 as well. This in consequence precludes the respective turns becoming mixed with one another in the different winding areas.

The strip 14 is formed from one part. Between its two ends, it passes through the three sections with winding areas and reversal points 15, 16 and 17. For this purpose, the strip 14 is fixed, for example at one of its ends, at the point 18 on the wall 1. It is then located in the area of the wall 1 as far as the reversal point 15, and is passed from there in the opposite winding direction to a turning point 19, which is fitted to the wall 2, in the area of the latter. From the turning point 19, the strip 14 runs in a different winding direction once again in the area of the wall 2 as far as the reversal point 16, from where it is passed in the area of the wall 1, once again in a different winding direction, to a turning point 20 which is fitted to the wall 1. From the turning point 20, the strip 14 runs, once again in the opposite winding direction, in the area of the wall 1 to the reversal point 17. From there, the strip 14 is passed in the area of the wall 2 to a point 21 at which its other end is fixed to the wall 2.

Figure 3:
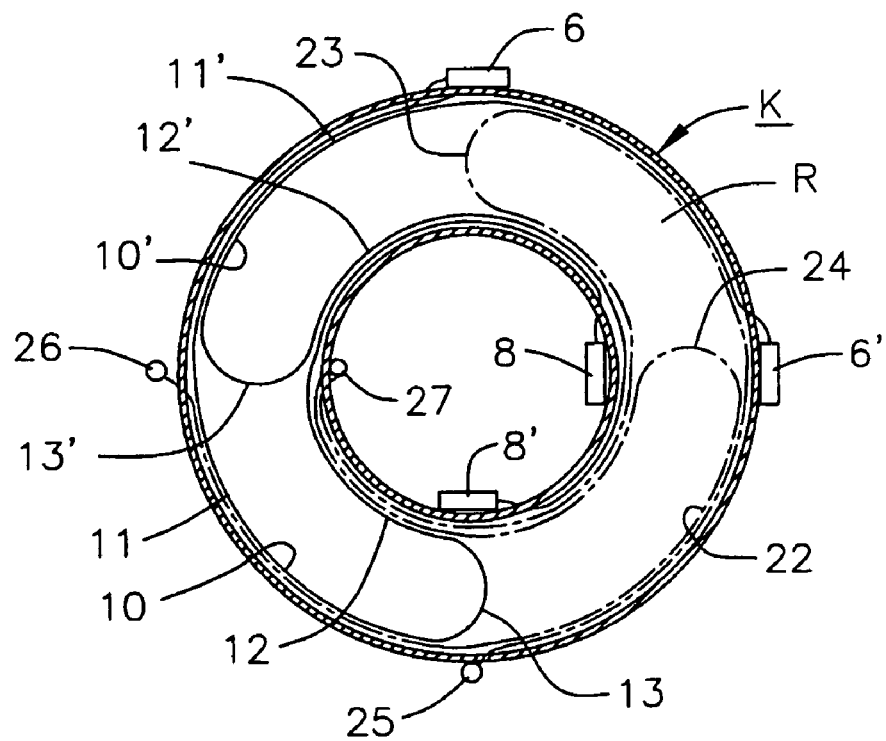

As shown in FIG. 3, the cassette K is equipped with two flat-ribbon lines 10 and 10' which are connected at end points 6 and 6' on the one hand and 8 and 8' on the other hand. Analogously to FIGS. 1 and 2, they each have two winding areas 11 and 11' as well as 12 and 12', as well as a respective U-shaped reversal point 13 and 13'. In this embodiment of the cassette K, a strip 22, which is once again shown by a dashed line, is used, having two sections which are offset in the circumferential direction of the cassette K and whose winding areas have reversal points 23 and 24. The strip 22 is fixed at one end to a point 25 and at its other end to a point 26, in each case on the wall 1. Analogously to FIG. 2—with corresponding winding areas with changing winding directions—and starting from the point 25 as a fixed point, it passes through the reversal point 23, a turning point 27 and the reversal point 24, and is fixed at the point 26.

This embodiment of the cassette K and of the strip 22 with two reversal points 23 and 24 has the advantage that the strip 22 is fixed at both ends on the same wall, in this case the wall 1, of the cassette K. This preferred embodiment of the strip 22 is also used when there are more than two flat-ribbon lines in one cassette K.

In one preferred embodiment, the strip 14 or 22 has an even number of sections with reversal points in all possible versions of the cassette K, such that both of its ends are attached either to the wall 1 or to the wall 2. Thus, in the case of cassette K as shown in FIG. 2 with only one flat-ribbon line 10—and in contrast to the illustration in the drawing—a strip 14 is advantageously used which has four sections with reversal points, three turning points and two attachment points, at which its ends are fixed. The attachment points are advantageously located on the outer wall 1.

The invention claimed is:

1. Apparatus for signal and current transmission between end points which can move relative to one another, between which at least one flat ribbon line, which runs in turns is arranged, which flat ribbon line has at least two electrical conductors, which are embedded in parallel and at a distance from one another in a sheath composed of insulating material, and which flat-ribbon line is subdivided into an inner winding area and an outer winding area, which is connected thereto by means of an approximately U-shaped reversal point, with each winding area having a different winding direction, and which flat-ribbon line is accommodated in an essentially circular cassette, in which the cassette comprises a rotor, which can rotate about its axis and is fitted with at least one of the end points, and a stationary stator, which is likewise fitted with at least one of the end points, which rotor and stator enclose between them an annular winding area for accommodation of the flat-ribbon line, and with one of the winding areas being arranged in the area of the rotor and the other being arranged in the area of the stator, wherein, in addition to the at least one flat-ribbon line, a strip, which runs in turns and is an insulating material, is arranged in the winding area of the cassette and in its profile has at least two sections which are offset with respect to one another in the circumferential direction of the cassette and have reversal points and associated winding areas with a different winding direction, which strip in its profile is placed around turning points, which are fitted to the stator and/or rotor of the cassette and from each of which the turns of winding areas of two different sections of the strip with an opposite profile originate, and which strip is fixed by its ends on the stator and/or on the rotor, said strip supporting said ribbon such that turns of said ribbon do not fall on one another, wherein said strip runs more turns than said ribbon and with a continually alternating winding direction precluding the respective turns becoming mixed with one another in the different winding areas.

2. Apparatus according to claim 1, wherein both ends of the strip are fixed on the rotor of the cassette.

3. Apparatus according to claim 1, wherein both ends of the strip are fixed on the stator of the cassette.

4. Apparatus according to claim 1, wherein the strip has an even number of sections with reversal points and is fixed by both of its ends either on the rotor or on the stator of the cassette.

5. Apparatus according to claim 1, wherein, said strip is made of polyester or polyethylenetherephthalate.

6. Apparatus according to claim 1, wherein said strip is formed from one part.

* * * * *